United States Patent
Amann et al.

(10) Patent No.: US 8,396,619 B2
(45) Date of Patent: *Mar. 12, 2013

(54) HYBRID DRIVE MOTOR VEHICLE CONTROL SYSTEM COMPRISING DISTRIBUTED FUNCTIONAL COMPONENTS FOR CONTROLLING HYBRID DRIVE OPERATING STATUS

(75) Inventors: Notker Amann, Friedrichshafen (DE); Christian Mittelberger, Ravensburg (DE); Stefan Blattner, Vogt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 332 days.

This patent is subject to a terminal disclaimer.

(21) Appl. No.: 12/739,236

(22) PCT Filed: Oct. 16, 2008

(86) PCT No.: PCT/EP2008/063937
§ 371 (c)(1),
(2), (4) Date: Apr. 22, 2010

(87) PCT Pub. No.: WO2009/053295
PCT Pub. Date: Apr. 30, 2009

(65) Prior Publication Data
US 2010/0318251 A1    Dec. 16, 2010

(30) Foreign Application Priority Data
Oct. 24, 2007    (DE) .......................... 10 2007 050 775

(51) Int. Cl.
*B60W 10/02*    (2006.01)
(52) U.S. Cl. ........ 701/22; 701/99; 701/102; 180/66.265; 180/65.275; 180/65.285; 477/5; 477/6; 903/946; 700/4

(58) Field of Classification Search .................. 700/4
See application file for complete search history.

(56) References Cited

U.S. PATENT DOCUMENTS
(Continued)

FOREIGN PATENT DOCUMENTS
DE    102006016810    * 10/2007
EP    0 925 979 A2    6/1999
(Continued)

OTHER PUBLICATIONS

Schilke et al., Integrated Vehicle Control, 1988, International Congress on Transportation Electronics (Convergence '88), pp. 97-106.*

*Primary Examiner* — Thomas Black
*Assistant Examiner* — Peter D Nolan
(74) *Attorney, Agent, or Firm* — Davis & Bujold, PLLC

(57) ABSTRACT

A vehicle control system with a hybrid drive comprising an engine and an electric motor and a plurality of functional components each divided into a strategy sub-component, a control sub-component and an actuator sub-component. The functional components include at least engine, transmission and hybrid functional components. The strategy sub-component (8) of the hybrid functional component (4) comprises an operating status prescription module (17) which reads in a first quantity of data from functional components in order to determine a prescribed value for the operating status of the hybrid drive, processes the read in data in order to produce a second quantity of output variables, and in a second sub-module (29), determines the prescribed value for the operating status of the hybrid drive using the output variables from the first sub-module (27) and with the help of automatic status-determining mechanism.

20 Claims, 2 Drawing Sheets

U.S. PATENT DOCUMENTS

| | | | |
|---|---|---|---|
| 5,815,824 A | 9/1998 | Saga et al. | |
| 5,979,257 A | 11/1999 | Lawrie | |
| 6,223,106 B1 * | 4/2001 | Yano et al. | 701/22 |
| 6,321,143 B1 * | 11/2001 | Phillips et al. | 701/22 |
| 6,360,152 B1 * | 3/2002 | Ishibashi et al. | 701/48 |
| 6,638,195 B2 * | 10/2003 | Williams | 477/5 |
| 6,735,502 B2 * | 5/2004 | Phillips et al. | 701/22 |
| 6,810,314 B2 * | 10/2004 | Tashiro et al. | 701/48 |
| 6,898,500 B2 * | 5/2005 | Kobayashi | 701/48 |
| 6,973,383 B2 * | 12/2005 | Mitsutani et al. | 701/112 |
| 7,017,692 B2 | 3/2006 | Grassl et al. | |
| 7,047,117 B2 * | 5/2006 | Akiyama et al. | 701/48 |
| 7,072,751 B2 * | 7/2006 | Shimizu | 701/36 |
| 7,198,123 B2 * | 4/2007 | Imazu et al. | 180/65.25 |
| 7,219,756 B2 * | 5/2007 | Bischoff | 180/65.285 |
| 7,219,757 B2 * | 5/2007 | Tomita et al. | 180/65.275 |
| 7,274,981 B2 * | 9/2007 | Eriksson | 701/37 |
| 7,317,978 B2 * | 1/2008 | Ashizawa et al. | 701/54 |
| 7,407,026 B2 * | 8/2008 | Tamor | 180/65.28 |
| 7,537,542 B2 * | 5/2009 | Cawthorne et al. | 477/3 |
| 7,568,994 B2 * | 8/2009 | Heap | 477/3 |
| 7,691,026 B2 * | 4/2010 | Heap et al. | 477/3 |
| 7,739,013 B2 * | 6/2010 | Ishio et al. | 701/48 |
| 7,766,107 B2 * | 8/2010 | Joe et al. | 180/65.21 |
| 7,826,941 B2 * | 11/2010 | Hayashi et al. | 701/22 |
| 7,878,281 B2 * | 2/2011 | Tanishima | 180/65.265 |
| 7,983,823 B2 * | 7/2011 | Heap | 701/51 |
| 8,167,066 B2 * | 5/2012 | Joos et al. | 180/65.265 |
| 2003/0098187 A1 | 5/2003 | Phillips et al. | |
| 2005/0023055 A1 * | 2/2005 | Imazu et al. | 180/65.2 |
| 2005/0049722 A1 * | 3/2005 | Kobayashi | 700/9 |
| 2006/0048516 A1 | 3/2006 | Tenbrock et al. | |
| 2006/0048988 A1 | 3/2006 | Dreibholz et al. | |
| 2007/0056783 A1 | 3/2007 | Joe et al. | |

FOREIGN PATENT DOCUMENTS

| | | |
|---|---|---|
| EP | 1 762 417 A1 | 3/2007 |
| WO | 02/26520 A1 | 4/2002 |
| WO | 2007/107361 A1 | 9/2007 |
| WO | 2009/053292 A1 | 4/2009 |

* cited by examiner

HYBRID DRIVE MOTOR VEHICLE CONTROL SYSTEM COMPRISING DISTRIBUTED FUNCTIONAL COMPONENTS FOR CONTROLLING HYBRID DRIVE OPERATING STATUS

This application is a National Stage completion of PCT/EP2008/063937 filed Oct. 16, 2008, which claims priority from German patent application serial No. 10 2007 050 775.7 filed Oct. 24, 2007.

FIELD OF THE INVENTION

The invention concerns a motor vehicle control system for controlling a motor vehicle with a hybrid drive comprising an internal combustion engine and an electric motor.

BACKGROUND OF THE INVENTION

A motor vehicle control system has a number of functional components, for example, an internal combustion engine functional component, a transmission functional component, a brake functional component and a battery functional component, such that the individual functional components acting in co-ordination ensure the correct operation of the motor vehicle. A motor vehicle control system, for controlling a motor vehicle with a hybrid drive, additionally requires a hybrid functional component.

In motor vehicle control systems known from the prior art for controlling a motor vehicle with hybrid drive, a recommended value for an operating status of the hybrid drive is generated with the help of so-termed automatic status-determining means. Owing to the number and variety of input parameters to be taken into account when determining a recommended value for the operating status of the hybrid drive, there are complex status-determining means which, on the one hand, can only be realized with much effort and expense and, on the other hand, can only be adapted or changed, again, with considerable effort and expense. Furthermore, the definition of suitable recommended values for the operating status of the hybrid drive presents difficulties.

SUMMARY OF THE INVENTION

Starting from there, the present invention addresses the problem of providing a new type of motor vehicle control system for controlling a motor vehicle with a hybrid drive comprising an internal combustion engine and an electric motor.

The motor vehicle control system, according to the invention, comprises a plurality of functional components divided into at least three sub-components, namely, a strategy sub-component, a control sub-component and an actuator sub-component, to be specific at least an internal combustion engine functional component for controlling the internal combustion engine, a transmission functional component for controlling a transmission and a hybrid functional component for controlling the electric motor and a clutch connected between the internal combustion engine and the electric motor, such that the strategy sub-component of the hybrid functional component comprises an operating status prescription module which, in order to determine a prescribed value for the operating status of the hybrid drive, reads in a first number of data from functional components, processes the read in data, in a second sub-module, in order to provide a second number of output parameters, and, in the second sub-module, determines the said prescribed value for the operating status of the hybrid drive using the said output parameters from the first sub-module with the help of an automatic status definer.

In the motor vehicle control system, according to the invention, the operating status prescription module of the strategy section of the hybrid functional component is divided into two sub-modules, the first sub-module serving to pre-process data read in and the second sub-module determining the prescribed value for the operating status of the hybrid drive using output parameters from the first sub-module and with the help of automatic status-determining means. By virtue of this division into two sub-modules of the operating status prescription module, according to the invention, a hierarchic division of the operating status prescription module is produced, whereby the structure of each sub-module can be relatively simple. Each of the sub-modules can be made, and can be modified and adapted, with relatively little effort and expense.

New input parameters, for the operating status prescription module, can be included with relatively little effort since then only the first, but not the second sub-module which includes the automatic status-determining means, has to be adapted. Moreover, the second sub-module with the automatic status-determining means can be adapted easily since it is independent of the quantity and type of the input parameters used for the operating status prescription module.

BRIEF DESCRIPTION OF THE DRAWINGS

Preferred further developments of the invention emerge from the subordinate claims and from the description given below. Example embodiments of the invention, to which it is not limited, are explained in greater detail with reference to the drawing, which shows:

DETAILED DESCRIPTION OF THE PREFERRED EMBODIMENTS

Figure 1:
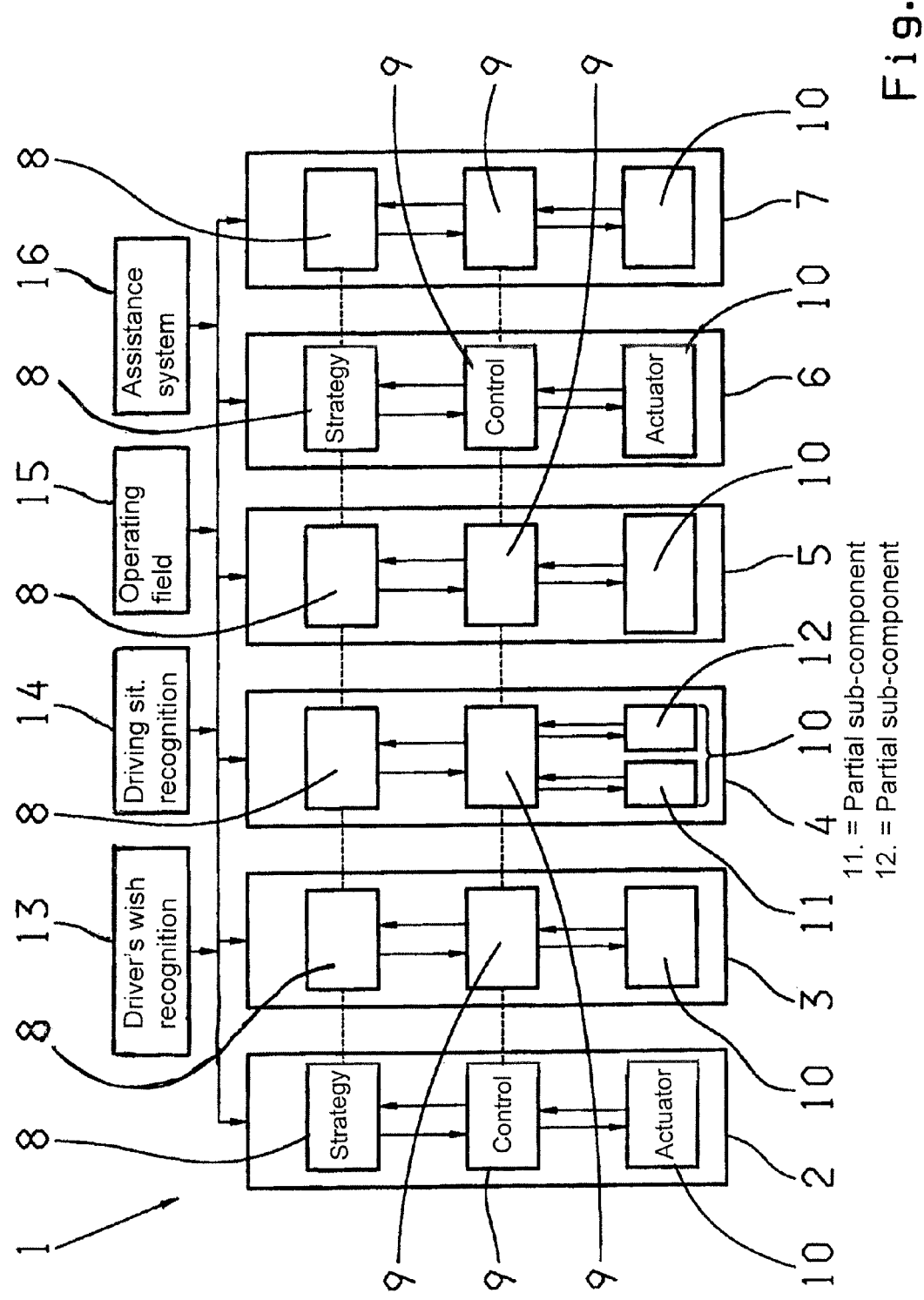
FIG. 1: A schematic block circuit diagram of a motor vehicle control system for controlling a motor vehicle with a hybrid drive that comprises a motor vehicle and an electric motor.

FIG. 1 shows a schematic block circuit diagram of a motor vehicle control system 1, according to the invention, for controlling a motor vehicle with a hybrid drive that comprises a motor vehicle and an electric motor.

The motor vehicle control system 1 comprises a plurality of functional components 2, 3, 4, 5, 6 and 7 each divided into three sub-components, such that each of the functional components 2 to 7 is divided into a strategy sub-component 8, a control sub-component 9 and an actuator sub-component 10.

In the example embodiment shown in FIG. 1, these functional components, divided into at least three sub-components, are, respectively, an internal combustion engine functional component 2 for controlling the internal combustion engine, a transmission functional component 3 for controlling a transmission, a hybrid functional component 4 for controlling the electric motor and a clutch connected between the internal combustion engine and the electric motor, a battery functional component 5 for controlling a battery, a brake functional component 6 for controlling a brake system and a retarder functional component 7 for controlling a retarder.

All the functional components 2 to 7 are divided into three sub-components 8, 9 and 10 but the actuator sub-component 10, of the hybrid functional component 4, is subdivided into two part-sub-components, namely, one part-sub-component 11 for the electric motor and one part-sub-component 12 for the clutch connected between the electric motor and the internal combustion engine.

Specific tasks or functions are assigned to the sub-components 8 to 10 of the functional components 2 to 7.

Thus, the strategy sub-component 8 of each functional component 2 to 7 at least serves to determine at least one recommended value for the respective functional component 2 to 7, namely, for the control sub-component 9 of the respective functional component 2 to 7. In addition, the strategy sub-component 8 of each functional component 2 to 7 serves to determine data for influencing the strategy sub-component 8 of at least one other functional component and the control sub-component 9 of at least one other functional component.

The control sub-component 9, of each functional component 2 to 7, serves to check the, or each, recommended value provided by the strategy sub-components 8 of the respective functional components 2 to 7 and thereby to determine at least one target value for the respective functional components. In addition, the control sub-component 9, of each functional component 2 to 7, serves to determine data for influencing the strategy sub-component 8 and/or the control sub-component 9 of at least one other functional component. Furthermore, the control sub-component 9 preferably serves to feed back at least one actual parameter value to the strategy sub-component 8 of the respective functional component.

The actuator sub-component 10, of each functional component 2 to 7, at least serves to implement the, or each, target value and to feed back at least one actual parameter value to the control sub-component 9 of the respective functional component 2 to 7.

In addition to the functional components 2 to 7 divided into three sub-components, the motor vehicle control system 1 of FIG. 1 comprises a plurality of functional components 13, 14, 15 and 16, which form an environment of the functional components 2 to 7. In FIG. 1, the functional components 13 to 16, that form the environment of the functional elements 2 to 7, consist of a driver's wish recognition functional component 13, which deduces a desired torque or a wish for sporty response on the basis of an accelerator pedal actuation and/or a brake pedal actuation, a driving situation recognition functional component 14, which deduces that the motor vehicle is driving round a curve and/or on an inclined road on the basis of transverse acceleration sensors and inclination sensors in the motor vehicle, an operating field function unit 15, which interrogates the selector lever and the operating elements of a transmission and/or retarder, and an assistance system functional component 16, which prescribes a torque and/or a speed.

The strategy sub-component 8 of the hybrid functional component 4 comprises at least a torque prescription module and an operating status prescription module 17. The torque prescription module serves to determine a recommended value for the torque distribution of a torque desired by the driver between the internal combustion engine and the electric motor of the hybrid drive. The operating status prescription module 17 serves to determine a prescribed value for the operating status of the hybrid drive.

The present invention now concerns such details of the strategy sub-component 8 of the hybrid functional component 4 as relate to the determination of a prescribed value for the operating status of the hybrid drive in the operating status prescription module of the strategy sub-component 8. The structure of the operating status prescription module 17 is described in detail below with reference to FIGS. 2 and 3.

Figure 2:
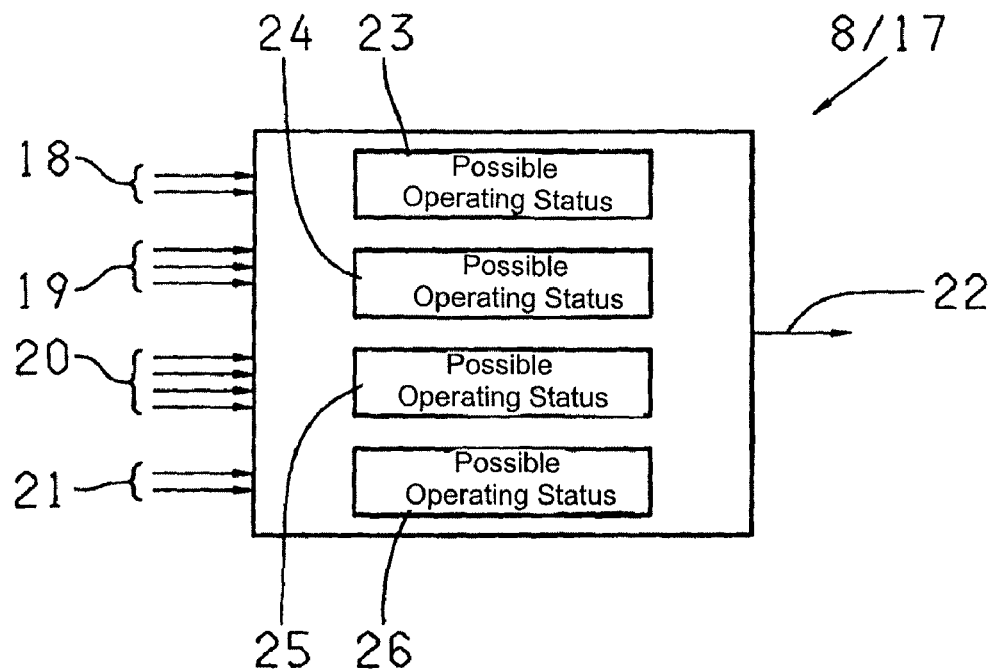
FIG. 2: A block circuit diagram showing a detail of the motor vehicle control system.

As indicated in FIG. 2, a plurality of input parameters are fed into the operating status prescription module 17, these input parameters being data from functional components which are read in by the operating status prescription module 17.

The data read in by the operating status prescription module 17 are the following input parameters:

condition data 18 for the drivability of the motor vehicle, these drivability data 18 consisting of sporty response data and data on whether the electric motor of the hybrid drive can fulfill a driving requirement;

condition data 19 for minimum fuel consumption and minimum emissions by the hybrid drive, these condition data 19 consisting of engine temperature data, battery charge status data and emissions data;

vehicle-specific condition data 20, these vehicle-specific data 20 consisting of data concerning the driver's wishes, driving speed data, driving situation data and selector element or selector lever data;

drivetrain-specific condition data 21, these drivetrain-specific condition data 21 consisting of current actual drivetrain values and drivetrain configuration data.

It should be mentioned that the above input data to the operating status prescription module 17 constitute a preferred selection of data from the functional components of the motor vehicle control system, although the quantity and nature of the data read in by the operating status prescription module 17, which serve as input data for it, of course can be varied. From the data 18 to 21 read in from the functional components, the operating status prescription module 17 of the strategy sub-component 8 of the hybrid functional component 4 generates an output signal 22, this output signal 22 being the prescribed value for the operating status of the hybrid drive. FIG. 2 schematically illustrates that as the said prescribed value for the operating status of the hybrid drive, the operating status prescription module 17 emits one of four possible operating statuses, a first possible operating status 23 being electric driving with the electric motor coupled to the drive output and the internal combustion engine static and decoupled from the drive output, a second possible operating status 24 being electric driving with the electric motor coupled to the drive output and the internal combustion engine running but decoupled from the drive output, a third operating status 25 being hybrid driving with the electric motor coupled to the drive output and the internal combustion engine running and also coupled to the drive output, and a fourth possible operating status 26 being a pre-selected hybrid driving condition.

The said pre-selected hybrid driving condition specifies a change from the electric driving operating status to the hybrid driving operating status, but leaves open the time when and the exact manner in which the said change from the electric driving to the hybrid driving operating status is carried out, so that the control sub-component 9, to which the prescribed value 22 for the operating status of the hybrid drive is transmitted as an input signal, itself determines the time when and the manner in which the change specified by the pre-selected hybrid driving condition, between electric and hybrid driving, occurs.

Figure 3:
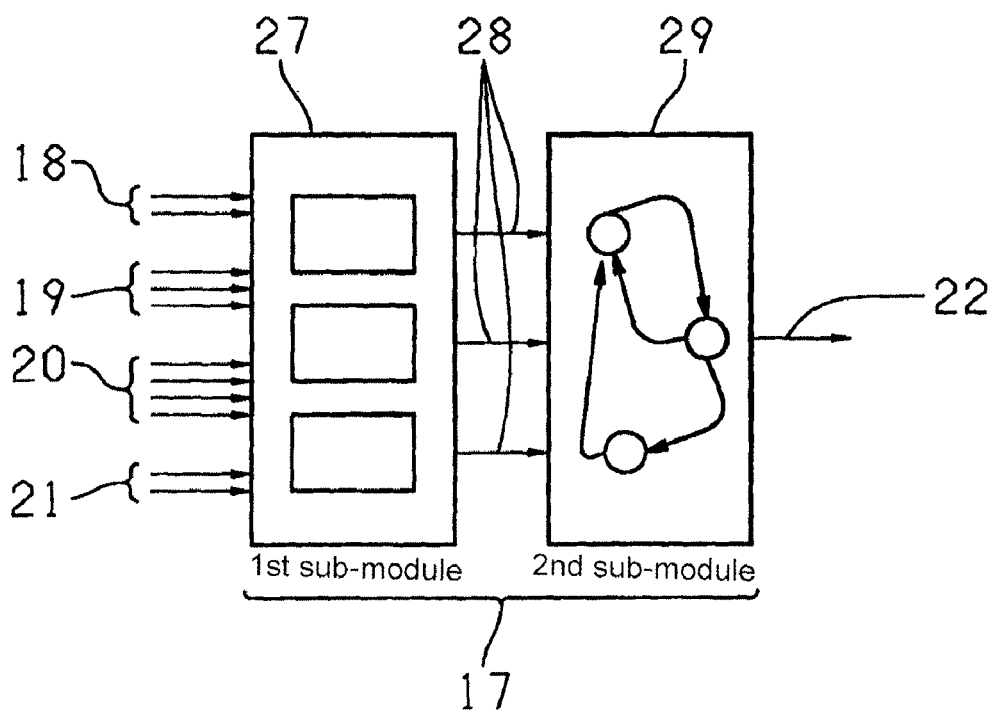
FIG. 3: A more detailed block circuit diagram of the details shown in FIG. 2.

According to the invention, as can be seen from FIG. 3, the operating status prescription module 17 is divided into two sub-modules, namely, a first sub-module 27 to which the input signals 18, 19, 20 and 21 of the operating status prescription module 17 are sent, so that the said first sub-module 27 can process the input signals 18 to 21, i.e., the data read in by the operating status prescription module 17, in order to produce output variables 28. The quantity of output data 28, emitted by the first sub-module 27, is smaller than the quantity of data 18 to 21 read in by the first sub-module 27. The output signals emitted by the first sub-module 27 are Boolean data such as "vehicle is moving fast", "vehicle is moving slowly", "engine temperature is high" or "emissions are low".

In addition to the first sub-module 27, which serves to pre-process the data 18 to 21 read in by the operating status prescription module 17, the operating status prescription module 17 of the motor vehicle control system, according to the invention, also comprises a second sub-module 29 in which, with the help of an automatic status-determining means or status-determiner, the prescribed value 22 for the operating status of the hybrid drive is determined, namely, by using the output variables 28 from the first sub-module 27.

Thus, in the motor vehicle control system, according to the invention, the operating status prescription module 17 of the strategy sub-component 8 of the hybrid functional component 4 is divided into two sub-modules such that the first sub-module 27 serves to pre-process the data 18 to 21 read in and to produce Boolean output signals 28, which are then used in the second sub-module 29 in automatic status-determining means to determine the prescribed value 22 for the operating status of the hybrid drive. As the said prescribed value 22, one of four defined operating statuses is emitted.

The structure of the operating status prescription module 17, according to the invention, allows simple adaptation and modification of the operating status prescription module 17.

INDEXES

1 Motor vehicle control system
2 Internal combustion engine functional component
3 Transmission functional component
4 Hybrid functional component
5 Battery functional component
6 Brake functional component
7 Retarder functional component
8 Strategy sub-component
9 Control sub-component
10 Actuator sub-component
11 Partial sub-component
12 Partial sub-component
13 Driver's wish recognition functional component
14 Driving situation recognition functional component
15 Operating field functional component
16 Assistance system functional component
17 Operating status prescription module
18 Input signal
19 Input signal
20 Input signal
21 Input signal
22 Prescribed value
23 Possible operating status
24 Possible operating status
25 Possible operating status
26 Possible operating status
27 First sub-module
28 Output signal
29 Second sub-module

The invention claimed is:

1. A motor vehicle control system for controlling a motor vehicle with a hybrid drive comprising an internal combustion engine and an electric motor, the vehicle control system comprising:

a plurality of functional components, each divided into at least three sub-components; and the at least three sub-components comprising a strategy sub-component (8), a control sub-component (9) and an actuator sub-component (10), the plurality of functional components including at least:
an internal combustion engine functional component (2) for controlling the internal combustion engine,
a transmission functional component (3) for controlling a transmission and
a dedicated hybrid functional component (4) for controlling only the electric motor and a clutch connected between the internal combustion engine and the electric motor such that;

the strategy sub-component (8), of the hybrid functional component (4), comprises an operating status prescription module (17) which reads in a first quantity of data from functional components in order to determine a prescribed value for an operating status of the hybrid drive, wherein the operating status prescription module (17) comprises a first sub-module (27) and a second sub-module (29);

the first sub-module (27), processes the first quantity of data in order to produce a smaller second quantity of output variables (28), and the second sub-module (29) utilizes the smaller second quantity of output variables (28) from the first sub-module (27), via an automatic status-determiner, to determine the prescribed value for the operating status of the hybrid drive.

2. The motor vehicle control system according to claim 1, wherein the second sub-module (29) of the operating status prescription module (17) determines, as the prescribed value for the operating status of the hybrid drive, one of the following operating conditions:

a) electric driving with the electric motor coupled to the drive output and the internal combustion engine static and decoupled from the drive output;
b) electric driving with the electric motor coupled to the drive output and the internal combustion engine running but decoupled from the drive output;
c) hybrid driving with the electric motor coupled to the drive output and the internal combustion engine running and also coupled to the drive output; and
d) a pre-selected hybrid driving condition.

3. The motor vehicle control system according to claim 2, wherein the pre-selected hybrid driving condition specifies a change from the electric driving operating status to the hybrid driving operating status.

4. The motor vehicle control system according to claim 3, wherein the first sub-module (27) of the operating status prescription module (17) emits Boolean parameters, as output signals (28), which are processed in the second sub-module (29).

5. The motor vehicle control system according to claim 2, wherein the first sub-module (27) of the operating status prescription module (17) emits Boolean parameters, as the smaller second quantity of output signals (28), which are processed in the second sub-module (29).

6. The motor vehicle control system according to claim 1, wherein the first sub-module (27) of the operating status prescription module (17) reads, as data from the functional components, at least one of the following input signals:
a) condition data (18) on drivability;
b) condition data (19) for minimum fuel consumption and minimum emissions;

c) vehicle-specific condition data (20); and
d) drivetrain-specific condition data (21).

7. The motor vehicle control system according to claim 6, wherein the first sub-module (27) of the operating status prescription module (17) emits Boolean parameters, as the smaller second quantity of output signals (28), which are processed in the second sub-module (29).

8. The motor vehicle control system according to claim 6, wherein the drivetrain-specific condition data (21) includes one of current actual drivetrain values and drivetrain configuration data.

9. The motor vehicle control system according to claim 1, wherein the first sub-module (27) of the operating status prescription module (17) reads, as data from the functional components, at least one of the following input signals:
   a) condition data (18) on drivability;
   b) condition data (19) for minimum fuel consumption and minimum emissions;
   c) vehicle-specific condition data (20); and
   d) drivetrain-specific condition data (21);
   the vehicle-specific condition data (20) includes at least one of a driver's wish data, driving speed data, driving situation data and selector element data; and
   the drivetrain-specific condition data (21) includes at least one of current actual drivetrain values and drivetrain configuration data.

10. The motor vehicle control system according to claim 9, wherein
   the condition data (18) on drivability includes one of a sporty response datum and data on whether the electric motor can achieve a driving requirement; and
   the condition data (19) for minimum fuel consumption and minimum emissions includes one of engine temperature data, battery charge status data and emission data.

11. The motor vehicle control system according to claim 1, wherein the first sub-module (27) of the operating status prescription module (17) emits Boolean parameters, as the smaller second quantity of output signals (28), which are processed in the second sub-module (29).

12. The motor vehicle control system according to claim 1, wherein the actuator sub-component (10) of the hybrid functional component (4) actuates the electric motor and the clutch connected between the electric motor and the internal combustion engine.

13. The motor vehicle control system according to claim 1, wherein the actuator sub-component (10) of the hybrid functional component (4) actuates only the electric motor and the clutch connected between the electric motor and the internal combustion engine.

14. A motor vehicle control system for controlling a motor vehicle with a hybrid drive comprising an internal combustion engine and an electric motor, the vehicle control system comprising:
   a plurality of functional components each divided into at least three sub-components; and the at least three sub-components comprising a strategy sub-component (8), a control sub-component (9) and an actuator sub-component (10);
   the plurality of functional components including at least:
      an internal combustion engine functional component (2) for controlling the internal combustion engine,
      a transmission functional component (3) for controlling a transmission, and
      a hybrid functional component (4) for controlling the electric motor and a clutch connected between the internal combustion engine and the electric motor;
   wherein the strategy sub-component (8), of the hybrid functional component (4), comprises an operating status prescription module (17) which reads in a first quantity of data (18, 19, 20, 21) from functional components in order to determine a prescribed value for an operating status of the hybrid drive;
   the operating status prescription module (17) comprises a first sub-module (27) and a second sub-module (29);
   the first sub-module (27) processes the first quantity of data in order to produce a second quantity of output variables (28);
   the second sub-module (29) determines the prescribed value for the operating status of the hybrid drive using the output variables (28) from the first sub-module (27); and
   the second quantity of output signals (28), from the first sub-module (27) of the operating status prescription module (17), is smaller than the first quantity of data (18, 19, 20, 21) read by the first sub-module (27) from the functional components.

15. The motor vehicle control system according to claim 14, wherein the first sub-module (27) of the operating status prescription module (17) emits Boolean parameters, as the smaller second quantity of output signals (28), which are processed in the second sub-module (29).

16. The motor vehicle control system according to claim 14, wherein the second sub-module (29) of the operating status prescription module (17) determines, as the prescribed value for the operating status of the hybrid drive, one of the following operating conditions:
   a) electric driving with the electric motor coupled to the drive output and the internal combustion engine static and decoupled from the drive output;
   b) electric driving with the electric motor coupled to the drive output and the internal combustion engine running but decoupled from the drive output;
   c) hybrid driving with the electric motor coupled to the drive output and the internal combustion engine running and also coupled to the drive output; and
   d) a pre-selected hybrid driving condition.

17. The motor vehicle control system according to claim 16, wherein the first sub-module (27) of the operating status prescription module (17) emits Boolean parameters, as the smaller second quantity of output signals (28), which are processed in the second sub-module (29).

18. The motor vehicle control system according to claim 16, wherein the pre-selected hybrid driving condition specifies a change from the electric driving operating status to the hybrid driving operating status.

19. The motor vehicle control system according to claim 18, wherein the first sub-module (27) of the operating status prescription module (17) emits Boolean parameters, as the smaller second quantity of output signals (28), which are processed in the second sub-module (29).

20. A motor vehicle control system for controlling a motor vehicle with a hybrid drive comprising an internal combustion engine and an electric motor, the vehicle control system comprising:
   a plurality of functional components, each divided into at least three sub-components;
   the at least three sub-components comprising a strategy sub-component (8), a control sub-component (9) and an actuator sub-component (10);
   the plurality of functional components including at least an internal combustion engine functional component (2) for controlling the internal combustion engine, a transmission functional component (3) for controlling a transmission and a dedicated hybrid functional component (4) for controlling only the electric motor and a clutch connected between the internal combustion engine and the electric motor such that;

the strategy sub-component (8), of the hybrid functional component (4), comprises an operating status prescription module (17) which reads in a first quantity of data from functional components in order to determine a prescribed value for the operating status of the hybrid drive;

wherein the operating status prescription module (17) comprises a first sub-module (27) and a second sub-module (29);

the first sub-module (27), processes the first quantity of data in order to produce a second quantity of output variables;

the second sub-module (29) utilizes the output variables from the first sub-module (27) to determine the prescribed value for the operating status of the hybrid drive;

the strategy sub-component of each functional component determines at least one prescribed value for the control sub-component of the respective functional component, and determines data for influencing the strategy sub-component of at least one other functional component and the control sub-component of at least one other functional component;

the control sub-component of each functional component checks each prescribed value provided by the strategy sub-components of the respective functional components and determines at least one target value for the respective functional components, and determines data for influencing one of the strategy sub-component for the respective functional component and the control sub-component of at least one other functional component, and the sub-component feeds back at least one current actual parameter value to the strategy sub-component of the respective functional component; and the actuator sub-component, of each functional component implements each target value, feeds back at least one current actual parameter value to the control sub-component of the respective functional component.

* * * * *